US006345835B1

(12) United States Patent
Watkins

(10) Patent No.: US 6,345,835 B1
(45) Date of Patent: Feb. 12, 2002

(54) VERTICALLY COLLAPSIBLE MOBILE CHAIR WITH FIXED TILTING MOVEMENT

(75) Inventor: Mervyn M. Watkins, Rancho Palo Verde, CA (US)

(73) Assignee: Convaid Products, Inc., Torrance, CA (US)

( * ) Notice: Subject to any disclaimer, the term of this patent is extended or adjusted under 35 U.S.C. 154(b) by 0 days.

(21) Appl. No.: 09/657,720

(22) Filed: Sep. 8, 2000

(51) Int. Cl.[7] .................................................. B62B 3/02
(52) U.S. Cl. ..................... 280/650; 280/47.371; 297/19
(58) Field of Search ................................ 280/647, 648, 280/649, 650, 47.371, 47.38; 297/19, 29, 30, 46, 57, 300.1, DIG. 4, 16.1, 16.2; 403/84

(56) References Cited

U.S. PATENT DOCUMENTS 1,434,777 A * 11/1922 Handler ....................... 297/19
2,289,031 A * 7/1942 Moeller ....................... 297/29
2,592,025 A * 4/1952 Gray ..................... 297/DIG. 4
3,550,998 A * 12/1970 Boudreau et al. ......... 280/47.38
3,995,882 A * 12/1976 Watkins ...................... 280/649
4,265,481 A * 5/1981 Fleischer ..................... 297/30
4,966,379 A * 10/1990 Mulholland ................. 280/650
5,286,046 A * 2/1994 Bottemiller et al. ...... 280/47.38
5,294,141 A * 3/1994 Mentessi et al. ............ 280/650
5,547,256 A * 8/1996 D'Antuono et al. ....... 297/16.1
5,727,809 A * 3/1998 Ordelman et al. .......... 280/650
5,921,574 A * 7/1999 Driessen et al. ......... 280/47.38
6,113,128 A * 9/2000 Watkins ...................... 280/647
6,116,624 A * 9/2000 Hu ............................. 280/650
6,139,046 A * 10/2000 Aalund et al. .............. 280/650
6,183,002 B1 * 2/2001 Choi et al. .................. 280/649

OTHER PUBLICATIONS

Color brochure from Mayra, Germany (in German language).

* cited by examiner

*Primary Examiner*—Donald P. Walsh
*Assistant Examiner*—Christopher Bottorff
(74) *Attorney, Agent, or Firm*—Oppenheimer Wolff & Donnelly LLP

(57) ABSTRACT

A mobile chair is provided which is configured to provide a comfortable sitting position for a seated user and to collapse for easy storage and transportation. Locking mechanisms enable the mobile chair to be either tilted or vertically collapsed into a compact position. The tilt function allows the seat and back components of the mobile chair to move as one piece, thereby providing a constant sitting angle for the seated user. Adjustable foot rests are also provided for additional comfort for persons seated in the mobile chair.

23 Claims, 5 Drawing Sheets

VERTICALLY COLLAPSIBLE MOBILE CHAIR WITH FIXED TILTING MOVEMENT

BACKGROUND OF THE INVENTION

1. Field of the Invention

This invention relates to a mobile chair. Specifically, the invention is directed to a mobile chair that is vertically collapsible into a compact configuration and that has a fixed tilting movement.

2. Description of the Related Art

Prior art mobile chairs have been used for the transport of infants, children, invalids, or anyone suffering from a debilitating disease or condition. They may also be used when a person is too weak or unable to walk. Often it is desirable to have a collapsible mobile chair to allow for convenient transportation and storage when the chair is not in use.

Some prior art mobile chairs, when in use, provide a single position for the seat and back relative to the frame of the chair. There are situations where the single position is uncomfortable. For example, a person seated in the mobile chair and wishing to sleep may be uncomfortable sitting in an upright position. Additionally, it may be necessary to tilt the seat to compensate for the movement of the mobile chair when it is pushed over or down some obstruction, such as a curb or the like, so that the person seated does not fall or undergo the sensation of being about to fall. The seat and back support structures must also, at all times during use, provide secure seating conditions regardless of the relative movement thereof with respect to the supporting frame.

In U.S. Pat. No. 3,995,882, a folding support structure is disclosed. This invention provides a stroller that is collapsible side-to-side and front-to-rear. However, this invention does not permit vertical collapsibility by lowering the structure toward the ground in a top-to-bottom manner. The absence of a vertical collapsing capability restricts the convenience and storage of the stroller.

In U.S. Pat. No. 5,294,141, a convertible wheelchair is disclosed. This invention provides a wheelchair that can be adjusted such that when a user reclines, the angle between the seat and the back remains constant. However, this invention also does not permit the vertical collapse of the wheelchair by lowering it in a top-to-bottom manner. As with the patent discussed above, the absence of a vertical collapsing capability restricts the convenience and storage of the wheelchair.

Similarly, in U.S. Pat. No. 5,547,256, an assembly for supporting children is disclosed. This invention provides an assembly which is capable of being collapsed in a front-to-rear manner. However, this invention does not provide the ability to tilt the seat and back while maintaining a constant angle in the sitting position, nor does it permit the vertical collapse of the assembly in a top-to-bottom manner. The absence of these features restricts the comfort of the user when sitting in the assembly and also the convenience and storage of the device.

Accordingly, there is a need in the art for a mobile chair which provides a comfortable seating position by allowing a seat and back portion, placed on the frame, to tilt as a unitary structure, and which is capable of being vertically collapsed from an upright position for easy transportation and storage.

SUMMARY OF THE INVENTION

The present invention provides a mobile chair which is vertically collapsible from an upright position and which allows the seat and back to tilt as a unitary structure. One object of the invention is to provide a mobile chair that is collapsible into a compact configuration for storage and transportation. Another object of the invention is to provide a comfortable seating position for a person seated in the mobile chair.

The mobile chair of the present invention includes a frame having upper frame supports, a handle portion, a rear frame member and a bottom frame member. A seat frame member is also included, as well as a seat and back portion. Handle systems on the frame control a locking mechanism which, when released, allows the frame to tilt. This tilting function allows the mobile chair tilt while maintaining a constant angle between a seat member and a back member.

The frame is vertically collapsible into a compact storage position by activating the handle systems. Telescoping tubes located on the seat frame member allow the components of the frame to collapse when the handle systems are activated and the frame is moved forward from its upright position.

DETAILED DESCRIPTION OF PREFERRED EMBODIMENTS OF THE INVENTION

Figure 1:
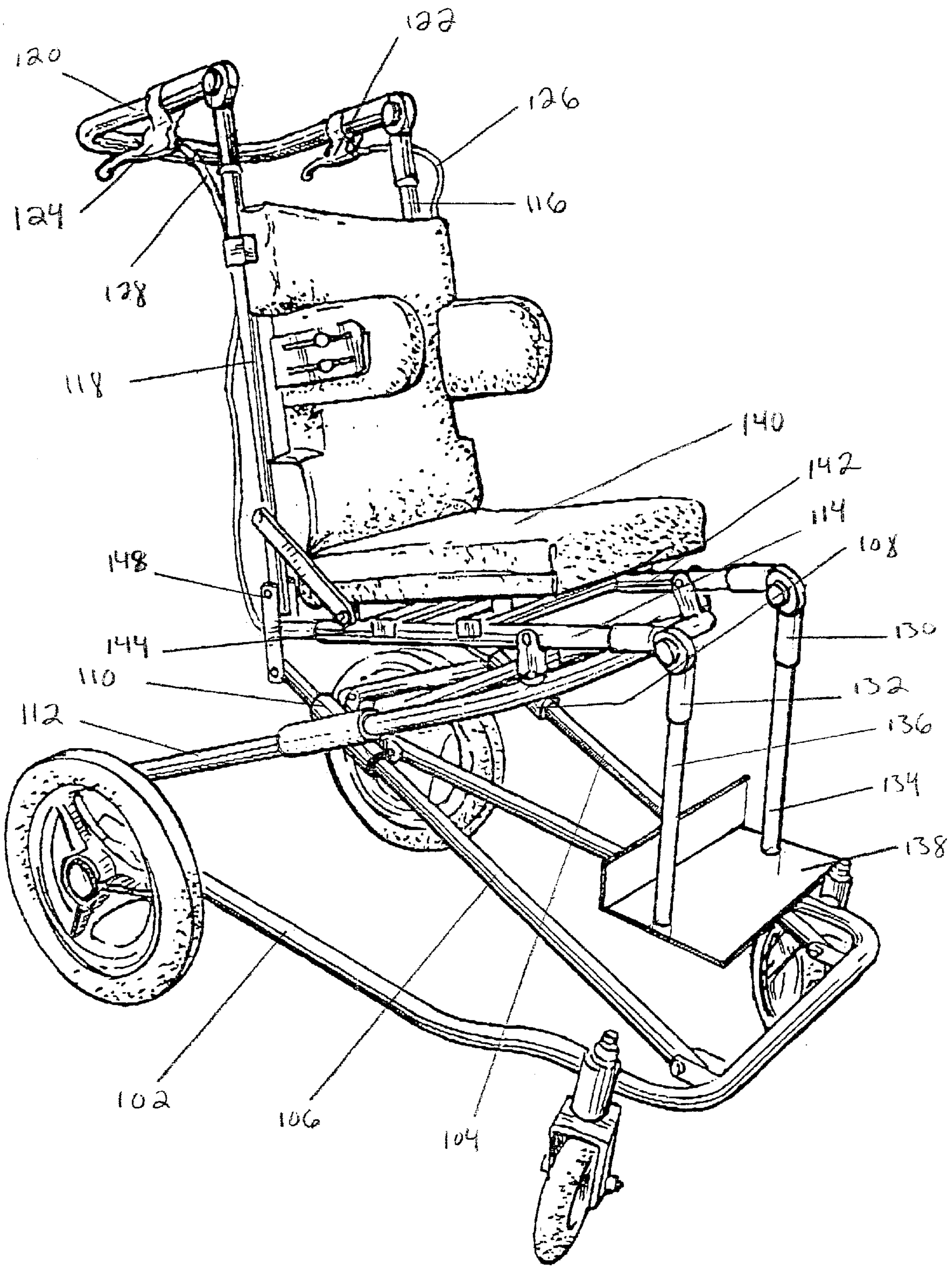
FIG. 1 shows a mobile chair in its upright position.

FIG. 1 shows a view of a mobile chair in its upright position. The mobile seat chair includes a bottom frame member 102. The bottom frame member 102 may be an elongated rod bent at two places to form a horseshoe-shaped member with a left front end and a right front end. The mobile chair also includes a first lower frame support brace 104 and a second lower frame support brace 106. The first lower frame support brace 104 includes a front end, a back end, and a locking mechanism 108. The second lower frame support brace 106 includes a front end, a back end, and a locking mechanism 110. The front ends of the first and second lower frame support braces 104 and 106 are hingeably coupled to the bottom frame member 102.

The mobile chair also includes a rear frame member 112. The rear frame member 112 includes a left side and a right side. The rear frame member 112 may be an elongated rod bent at two places to form a horseshoe-shaped member. The mobile chair may also include a seat frame member 114. The seat frame member 114 includes a first side member and a second side member, each side member having a front end and a back end. At least one seat frame cross brace may also be included in the seat frame member. The front end of the first side of the seat frame member 114 is hingeably coupled to the rear frame member 112. The front end of the second side of the seat frame member 114 is hingeably coupled to the rear frame member 112.

The mobile chair also includes a first upper frame support 116 having a top end and a bottom end, and a second upper frame support 118 also having a top end and a bottom end. The bottom end of the second upper frame support 118 is hingeably coupled to the back end of the second lower frame support brace 106. The back end of the second side member of the seat frame member 112 is also hingeably coupled to the back end of the second lower frame support brace 106 and the bottom end of the second upper frame support 118. The bottom end of the first upper frame support 116, the back end of the first lower frame support brace 104, and the back end of the first side member of the seat frame member 114 are all hingeably coupled together.

The top end of the first upper frame support 116 and the top end of the second upper frame support 118 are each hingeably coupled to a handle portion 120. The handle portion 120 is a elongated rod bent at two places to form a horseshoe-shaped member. The handle portion 120 includes a left end and a right end. The left end is hingeably coupled to the top end of the left upper frame support 116, and the right end is hingeably coupled to the top end of the second upper frame support 118. The handle portion 120 and the upper frame supports 116 and 118 are hingeably coupled by a pair of locking pieces. These locking pieces may be releasable to allow the handle portion 120 to collapse to a substantially parallel position relative to the first and second upper frame supports 116 and 118.

The mobile chair also includes a first handle system and a second handle system. Each handle system includes a lever, a coupling piece and a cable. The first and second levers 122 and 124 are hingeably coupled to the handle portion 120 by the coupling pieces. The cables 126 and 128 extend from the levers 122 and 124 to the locking mechanisms 108 and 110. These locking mechanisms are located on the first and second lower frame support braces 104 and 106.

The mobile chair also includes a plurality of wheels. A left front wheel is coupled to the left front end of the bottom frame member 102. A right front wheel is coupled to the right front end of the bottom frame member 102. A left rear wheel is coupled to the left end of the rear frame member 112. Also, a right rear wheel is coupled to the right end of the rear frame member 112.

The mobile chair may also include a leg rest assembly. In one embodiment the leg rest assembly is hingeably coupled to the seat frame member 118 at each of the front ends of the left and right sides of the seat frame member. The leg rest assembly includes a left leg rest support 130, a right leg rest support 132, a left foot rest support tube 134, a right foot rest support tube 136, and a foot rest member 138. The foot rest support tubes 134 and 136 are releasably coupled to the foot rest member 138. Each of the leg rest supports 130 and 132 may include a plurality of grooves and a positioning mechanism. The positioning mechanisms allow the adjustment of the height of the foot rest member 138 by moving the positioning mechanisms to different grooves in the leg rest supports. The two positioning mechanisms couple the foot rest support tubes to the left and right leg rest supports.

In one embodiment, a seat and back portion 140 may be placed onto the frame of the mobile chair. This is also shown in FIG. 1. The seat and back portion includes a back member, a seat member, a left arm rest, and a right arm rest. In an alternate embodiment, the seat and back portion 140 comprises padded or webbed seat and back members made of a sturdy yet flexible fabric capable of stretching and folding. In this embodiment, the seat and back members tighten around the person sitting in the chair with belts and/or loops. Belts and/or loops may also be used to fasten the seat and back portion to the mobile chair. Also in this embodiment, arm rest tubes may also be included in the frame of the mobile chair to provide arm support for a person seated in the chair.

The seat frame member 114 also includes a first seat frame telescope tube 142 and a second seat frame telescope tube 144. The first seat frame telescope tube is coupled to the first upper frame support 116 by a first linkage mechanism 146. The second seat frame telescope tube is coupled to the second upper frame support 118 by a second linkage mechanism 148. The first and second seat frame telescope tubes are hollow and are configured to slide over the first and second side members of the seat frame member. The linkage mechanisms 146 and 148 may also include releasable buttons configured to lock the first and second seat frame telescope tubes in place.

In another embodiment of this invention, the mobile chair of FIG. 1, while shown in its upright position, is capable of vertical collapse. The activation of the handle systems triggers the vertical collapse of the frame. When the handle levers are depressed, the upper frame supports begin to move in a downward direction as the handle portion is moved forward. This causes, the first and second seat frame telescope tubes to extend forward, which pushes the rear frame member down and eventually results in the upper frame supports, seat frame member, rear frame member and bottom frame member all lying in a position substantially parallel to each other. In yet another embodiment, the mobile chair of FIG. 1 is capable of being tilted to provide a more comfortable sitting position for the user. This is also triggered by activation of the handle systems.

Figure 2:
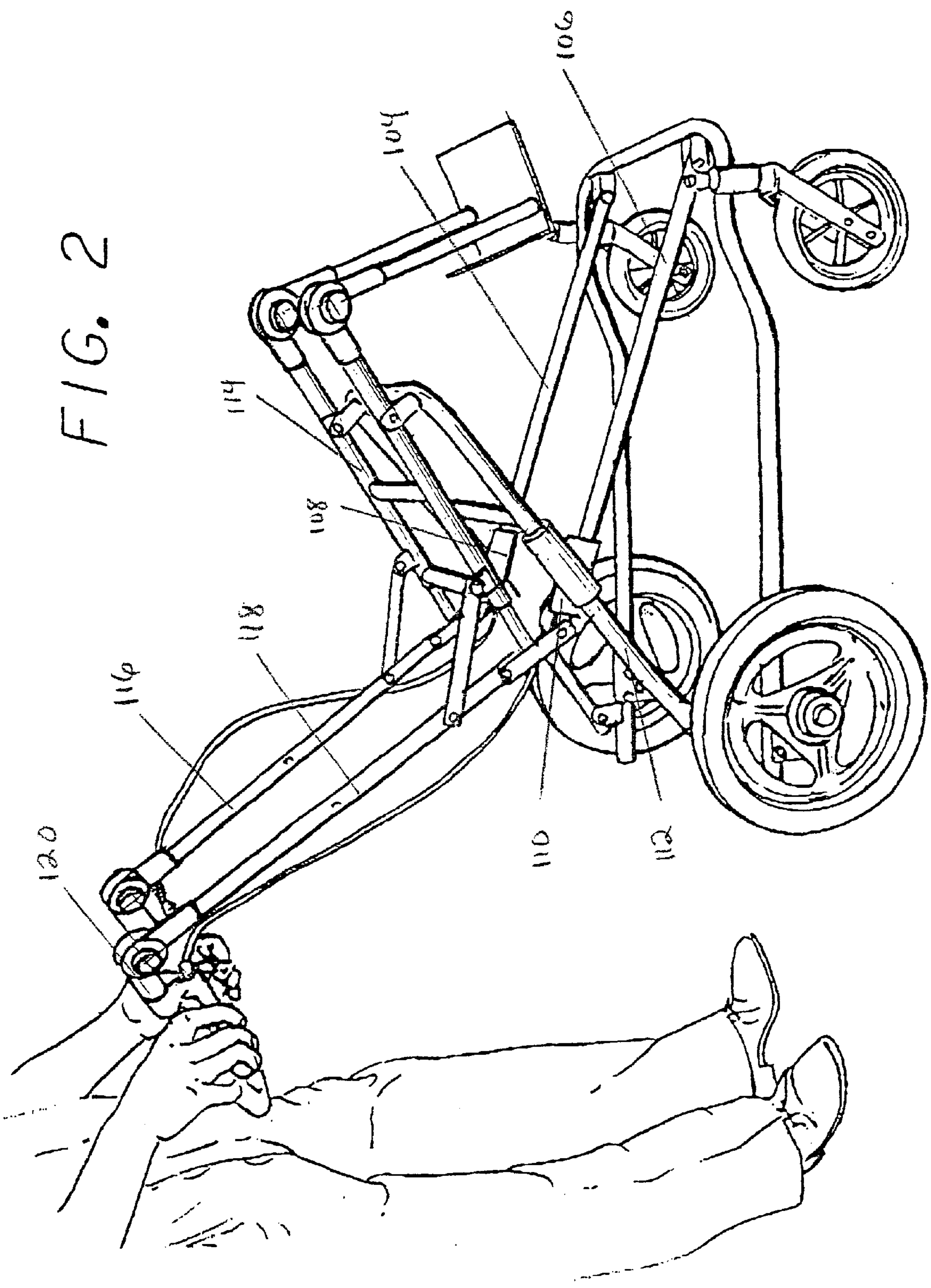
FIG. 2 shows a mobile chair being tilted with the seat and back portion maintained as a unitary structure.

FIG. 2 illustrates the tilting aspect of the mobile chair. In FIG. 2, the frame is tilted from the upright position shown in FIG. 1. This mobile chair tilts by activating the first and second handle systems and lowering the handle portion 120. This action releases the locking mechanisms 108 and 110 on the first and second lower frame support braces 104 and 106 and allows the locking mechanisms to rotate relative to the rear frame member 112. This allows the seat frame member 114 to move upward at the same time that the handle portion, and thus the first and second upper frame supports 116 and 118 are lowered.

The tilting of the mobile chair also allows the seat and back portion to move without altering the angle existing between the seat and back members. Thus, the angle between the seat and back members does not change when the mobile chair is moved from an upright position to a tilted position. The seat and back portion is therefore maintained as a unitary structure. This feature provides a continuous comfortable sitting position for a person seated in the mobile chair.

Figure 3:
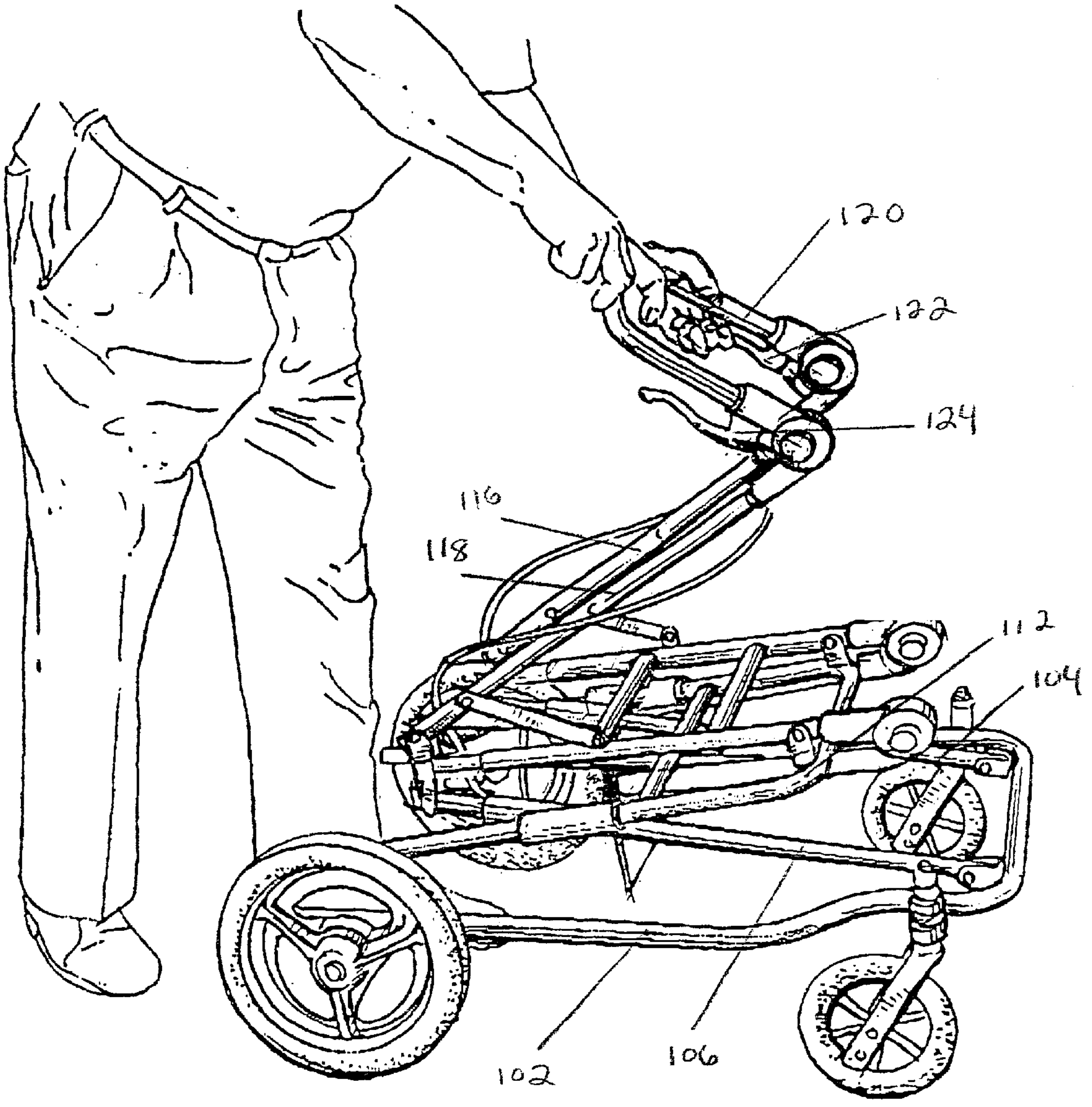
FIG. 3 shows a mobile chair in a semi-folded position.

FIG. 3 shows the mobile chair being vertically collapsed from its upright position. The lowering of the frame for vertical collapse is initiated by activating the first and second handle systems in the same manner as discussed above in FIG. 2. When the handle systems are activated, the handle portion 120 is moved forward. It is important to note that FIG. 3 shows one position in the collapsing process and therefore is merely an example of one position of forward movement that can be achieved by activating the handle systems and moving the handle portion 120 forward.

In the same manner as in FIG. 2, the handle systems are activated by pressing the handle levers 122 and 124 against the handle portion 120. This causes a lock tab 150 in each of the locking mechanisms 108 and 110 to press against a spring 152 (see FIG. 6), thereby releasing the locking mechanisms and allowing them to slide along their respective lower frame support braces 104 and 106 relative to the rear frame member 112. Moving the handle portion 120 forward while activating the handle systems causes the rear frame member 112 to collapse toward the bottom frame member 102 and causes the upper frame supports 116 and 118 to move relative to the coupling piece that couples the upper frame supports, the seat frame member and the first and second lower frame support braces.

Figure 4:
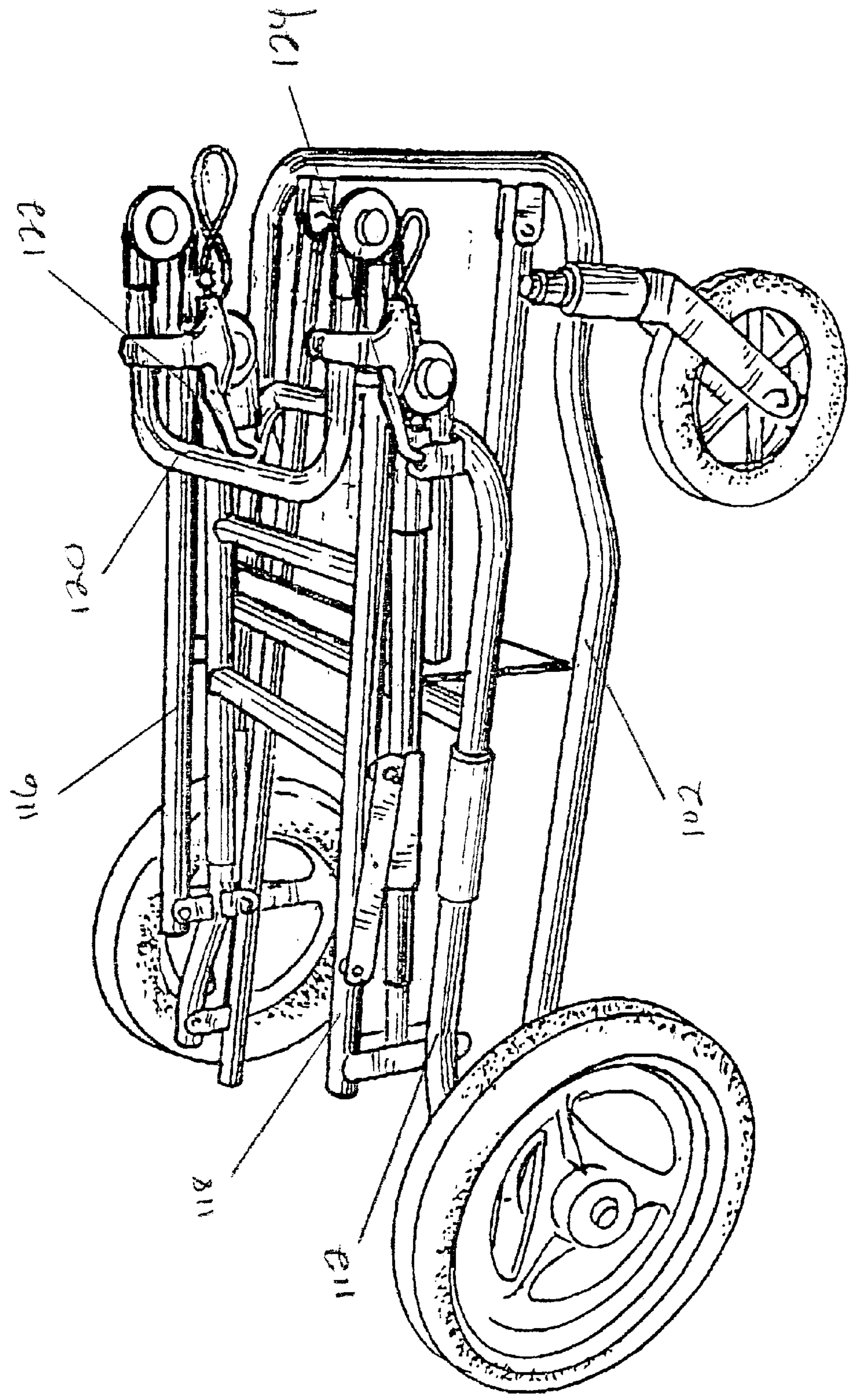
FIG. 4 shows a mobile chair in its vertically collapsed position.

FIG. 4 shows the mobile chair in its collapsed position. This position is achieved when the first and second handle systems have been activated and the frame moved forward until it reaches its complete vertically collapsible position. As above, the position is reached by activating the handle systems and moving the handle portion 120 forward. When the handle levers 122 and 124 are released, the locking mechanisms 108 and 110 secure the mobile chair in the position desired by the user. In the case of the collapsed position, the locking mechanisms 108 and 110 secure the mobile chair for storage and transportation of the device.

Figure 5:
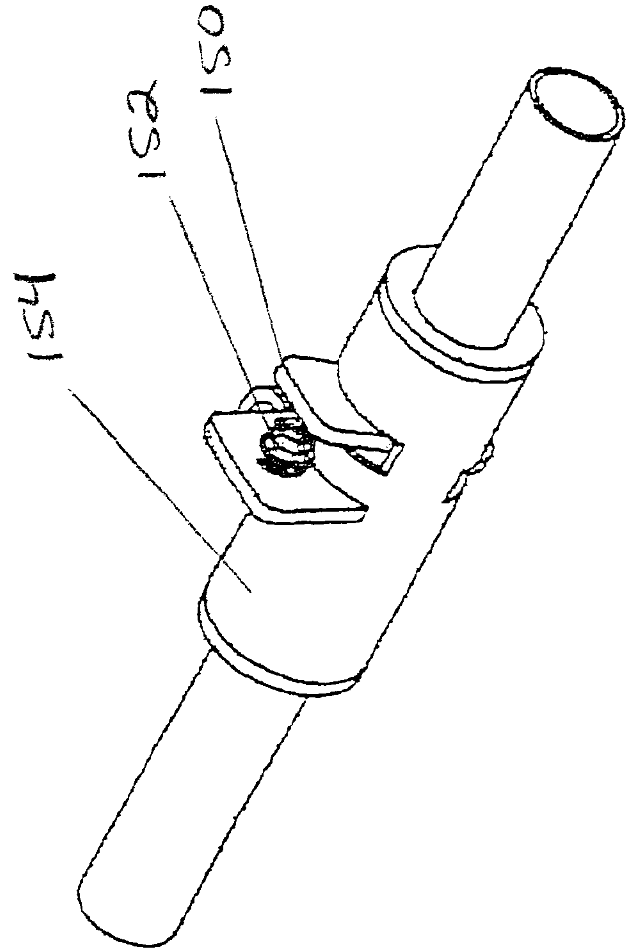
FIG. 5 shows a perspective close-up view of a locking mechanism.

FIG. 5 shows a perspective view of one of the locking mechanisms of the mobile chair. Each of the lower frame support braces of the mobile chair includes a locking mechanism, which is also coupled to a side of the rear frame member. Each locking mechanism includes a lock tab 150 and a spring 152. The lock tab 150 and the spring 152 are contained within a housing 154. The housing 154 is a hollow tube which allows the locking mechanism to slide relative to the respective lower frame support brace when the mobile chair is being tilted or collapsed. The handle cables of the first and second handle systems are also coupled to the locking mechanisms.

The operation of the locking mechanism occurs when the first and second handle systems are activated. The lock tab is compressed against the spring as the handle levers are pressed. This movement of the lock tab allows the locking mechanism to slide freely on the lower frame support brace on which it is located, relative to the seat frame member. When the user of the handle systems has determined the proper tilt or collapse position of the chair, the handle systems are deactivated and the lock tab returns to its lock position. The secures the locking mechanism in place on the lower frame support brace, thereby locking the mobile chair in the desired position.

what is claimed is:

1. A vertically collapsible and tiltable mobile chair frame, the frame comprising:

a bottom frame member;

a rear frame member hingeably coupled to the bottom frame member; a first lower frame support brace and a second lower frame support brace, each lower frame support brace having a locking mechanism, the first and second lower frame support braces being hingeably coupled to the bottom frame member and the rear frame member;

a first upper frame support and a second upper frame support;

a handle portion hingeably coupled to the first and second upper frame supports;

a seat frame member;

a leg rest assembly hingeably coupled to the seat frame member;

a plurality of wheels;

a seat and back portion; and a first handle system and a second handle system, the handle systems allowing the seat and back portion to tilt as a unitary structure and allowing the frame to vertically collapse to a compact position.

2. The frame of claim 1, wherein each handle system is hingeably coupled to the handle portion.

3. The frame of claim 2, wherein the first and second handle systems each include:

a lever;

a coupling piece, said coupling piece coupling the lever to the handle portion; and a cable having an upper end and a lower end, the lower end being connected to the locking mechanism and the upper end being connected to the lever.

4. The frame of claim 1, wherein the seat and back portion includes a seat member and a back member, and wherein the back member is removably coupled to the first and second upper frame supports and the seat member is removably coupled to the seat frame member.

5. The frame of claim 1, wherein the rear frame member further includes at least one cross brace.

6. The frame of claim 1, wherein the locking mechanisms of the first and second lower frame support braces are slidably coupled to the rear frame member.

7. The frame of claim 1, wherein each locking mechanism comprises a lock tab, a spring, and a housing.

8. The frame of claim 7, wherein activating the handle systems compresses the lock tabs of the locking mechanisms against their respective springs, allowing the locking mechanisms to slide along their respective lower frame support braces.

9. The frame of claim 8, wherein releasing the first and second handle systems allows the lock tabs to secure the locking mechanisms at a desired position, locking the frame in place.

10. The frame of claim 1, wherein the seat frame member includes at least one cross brace.

11. The frame of claim 10, wherein the seat frame member comprises a first side member and a second side member, each side member having a front end and a back end.

12. The frame of claim 11, wherein the seat frame member further comprises a first seat frame telescope tube, a second seat frame telescope tube, a first linkage mechanism linking the first side member to the first upper frame support, and a second linkage mechanism linking the second side member to the second upper frame support.

13. The frame of claim 12, wherein the vertical collapse of the first and second upper frame supports extends the first and second seat frame telescope tubes forward by causing movement in the first and second linkage mechanisms, and wherein the forward extension of the first and second seat frame telescope tubes causes the rear frame member to collapse toward the bottom fame member.

14. The frame of claim 10, wherein the leg rest assembly is coupled to a front end of first and second sides of the seat frame member.

15. The frame of claim 1, wherein the leg rest assembly comprises a left leg rest support, a right leg rest support, a left foot rest support tube, a right foot rest support tube, and a foot rest member.

16. The frame of claim 15, wherein each leg rest support includes a plurality of grooves and a positioning mechanism.

17. The frame of claim 16, wherein the left leg rest support is configured to retract into the left foot rest support tube when the positioning mechanism is released, and wherein the right leg rest support is configured to retract into the right foot rest support tube when the positioning mechanism is released.

18. The frame of claim 16, wherein the position of the foot rest member is adjustable by moving the positioning mechanism between the grooves on each leg rest support.

19. The frame of claim 1, wherein the seat and back portion includes a flexible seat member and a flexible back member.

20. A method of vertically collapsing a mobile chair frame, comprising:

activating a first handle system and a second handle system, the first and second handle systems being coupled to the frame; and lowering the frame from an upright position, the frame including a bottom frame member, a rear frame member hingeably coupled to the bottom frame member, a first lower frame support brace and a second lower frame support brace, each lower frame support brace having a locking mechanism, a first upper frame support, a second upper frame support, a handle portion hingeably coupled to the first and second upper frame supports, a seat frame member, and a leg rest assembly hingeably coupled to the seat frame member.

21. A method of claim 20, wherein the activation of the handle systems allows a seat and back portion, placed onto the frame, to tilt as a unitary structure.

22. A method of tilting a mobile chair frame, comprising:

activating a first handle system and a second handle system, the first and second handle systems being coupled to the frame; and lowering the frame from an upright position, the frame having a seat and back portion that is tilted as a unitary structure, said frame further including a bottom frame member, a rear frame member hingeably coupled to the bottom frame member, a first lower frame support brace and a second lower frame support brace, each lower frame support brace having a locking mechanism, a first upper frame support, a second upper frame support, a handle portion hingeably coupled to the first and second upper frame supports, a seat frame member, and a leg rest assembly hingeably coupled to the seat frame member.

23. A method of claim 22, wherein lowering the frame allows the frame to vertically collapse to a compact position.

* * * * *